Dec. 18, 1962  E. A. STALKER  3,068,824
APPARATUS FOR BONDING
Filed Jan. 30, 1957
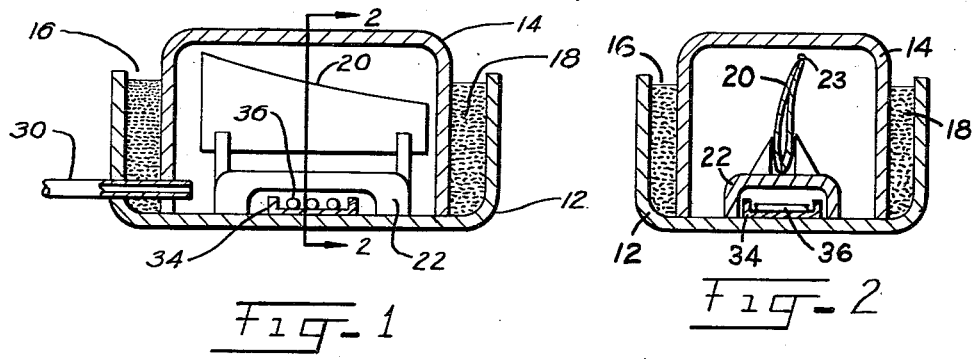
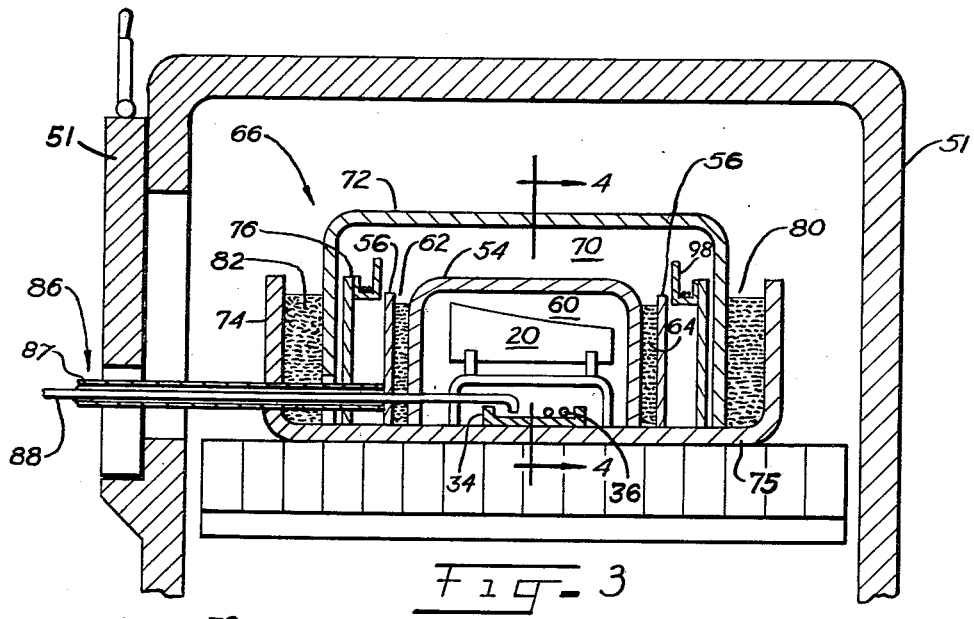
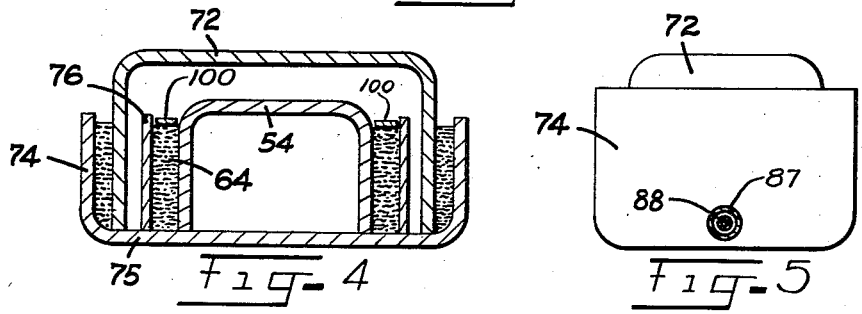
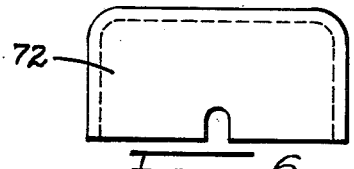
INVENTOR.
EDWARD A. STALKER
BY
ATTORNEYS

United States Patent Office 3,068,824
Patented Dec. 18, 1962

3,068,824
APPARATUS FOR BONDING
Edward A. Stalker, Bay City, Mich., assignor to Stalker Corporation, a corporation of Michigan
Filed Jan. 30, 1957, Ser. No. 637,268
3 Claims. (Cl. 113—59)

This invention relates to the soldering of metal parts, particularly high temperature soldering frequently called brazing.

An object of the invention is to provide a process for soldering metal parts in an atmosphere which is particularly free of either or both of the elements oxygen and nitrogen.

Another object is to provide apparatus for securing a pure atmosphere within the brazing muffle.

Other objects will appear from the specification, appended claims and accompanying drawings in which—

FIG. 1 is a vertical longitudinal section through a muffle according to this invention for use in soldering an assembly of parts;

FIG. 2 is a section on line 2—2 of FIG. 1;

FIG. 3 is a vertical section through a portion of a furnace and another muffle means according to this invention;

FIG. 4 is a transverse section through the muffle means of FIG. 3 on line 4—4;

FIG. 5 is an end view of the muffle; and

FIG. 6 is an end view of the inner muffle cover.

It is common practice to solder parts together by heating them in a reducing or non-oxidizing atmosphere. For instance stainless steel parts may be held together by various means with solder adjacent the joints. This assembly is placed in a muffle which is heated by induction means or by placing in a furnace. A gas, commonly hydrogen, is then passed through the muffle while it is heated to the melting temperature of the solder.

The hydrogen combines with the oxides of the steel preparing the surface for the spreading of the molten solder, and its adherence or alloying with the walls of the parts to be joined. It is important that the oxides be removed as completely as possible to assure good fluidity of the solder and to improve the quality of the joints.

A convenient muffle is shown in FIG. 1 comprising a hollow base part 12 and a hollow cover part 14 positioned within the base part and spaced from its side walls. The walls defined a seal space 16 therebetween which is filled with a granular material like sand for instance to seal the interior wherein the assembly 20 to be soldered is placed. The assembly is supported in rack 22 and solder 23 in strip or wire form is located at the joints of the assembly to be secured.

Hydrogen may then be fed into the interior of the muffle by the duct means 30 and under a slight pressure such that it will slowly seep and escape through the granular seal. The hydrogen will burn at the upper boundary of the seal. The granular seal is very convenient in use, particularly in rapid production of soldered assemblies of parts but there is some leakage of air and water vapor through the seal into the muffle interior. For many applications the purity of the atmosphere within the interior obtained by this arrangement is satisfactory. For instance a dew point of about −30° F. may be readily maintained with the inflow of hydrogen at a dew point of about −90° F.

In soldering many materials, for instance stainless steels containing aluminum or titanium, high quality joints are only obtained if the dew point within the muffle is very low, preferably of the order of −70° F. Furthermore a low dew point should be reached very early in the furnace cycle. For instance if a nickel-chromium (with boron or silicon) solder material is being employed with a stainless steel having an aluminum content it is desirable to achieve a low dew point at about 1200–1300° F. It is further desirable that any nitrogen be eliminated from the interior of the muffle. This is difficult to do particularly with a granular seal.

The hydrogen is passed through a drier before entering the muffle to remove oxygen and water. Furthermore the muffle is purged for a period of time to remove the air and whatever contaminants it contains. Even with a long purging time however there will remain traces of oxygen, nitrogen and water as contaminants since some of these may be adsorbed on the surfaces or retained in the molecular or surface structure of the parts. It is therefore desirable to provide a means of eliminating such gases from the internal atmosphere as they are driven off the parts by the heating.

In the process of this invention, an economical means of removing oxygen, water molecules and nitrogen from the gas within the interior of the muffle is employed. A shallow tray 34 is put in the bottom of the muffle and a quantity of magnesium 36 is placed in the tray. Magnesium has a great affinity for oxygen, water molecules and nitrogen and will abstract them from the gas.

As the muffle is heated the magnesium first picks up free oxygen and takes the oxygen away from the hydrogen of the water molecules releasing free hydrogen. These actions begin at about 112° F. Nitrogen is absorbed at about 1240° F. and above. At these temperatures there is therefore a sharp drop in the dew point and the nitrogen content so that the nickel-chrome solder will have received little or no injury from the contaminants, oxygen and nitrogen, initially present or leaking into the muffle. It is important that the solder be protected from these contaminants to preserve the fluidity of the solder when it melts, and its strength properties. With the presence of the magnesium in the muffle, the solder is very fluid above its melting temperature and rapidly spreads over large surfaces of the parts to be joined.

Magnesium is the preferred metal for purifying the interior of the muffle because of its low cost, its affinity for both nitrogen and oxygen, its ability to reduce molecules of water and because it does not alloy with ordinary steel which can then be used to contain the molten magnesium. All these factors make magnesium quite effective and economical to use.

Aluminum however may also be used to eliminate oxygen. It should be contained in clay or ceramic vessels since it alloys readily with iron.

Molybdenum may also be used since it has a high affinity for oxygen. It is particularly useful with inert gases such as argon and helium which are employed as atmospheres for the soldering of titanium. Lithium is another metal which may be employed in the tray. In general metals which are not reduced by hydrogen are preferred for use in the muffle.

The muffle is heated by any suitable means to the proper temperature to cause the solder at the joints of the assembly to become molten so that it will flow into the joints and thereafter the heat is removed and the assembly allowed to cool with resulting solidification of the solder and the bonding of the parts together.

An alternate apparatus is shown in FIGS. 3–6 in a portion of a heating furnace 50 having a liftable closure 51 at one end thereof. The apparatus comprises an inner muffle of a hollow inverted cover part 54 and walls 56 spaced apart defining a hollow interior 60 for housing the assembly to be soldered. The upright walls of the parts lap each other defining a seal space 62 between them which is filled with the seal 64 of granular material such as sand.

An outer muffle means 66 encloses the inner muffle with a space 70 of substantial volume between them. This means comprises an upper inverted cover part 72 enveloping the inner muffle and having side walls lapping the upright side walls 74 of a shell integral with the bottom plate 75 and having interior wall 76. The side walls of the upper part and the upright walls 74 define a seal space 80 for the outer sand seal 82.

The selected atmosphere such as hydrogen is directed into the inner muffle by the duct means 86 and flows outward through the inner seal into the space of the outer muffle and then outward through the outer seal. The duct means 86 may, as shown, comprise a pipe 87 extending through the walls of the outer muffle up to the inner wall 56 to which it is fixed in sealed relation thereto. A tube 88 within the pipe extends into the inner muffle and discharges the selected gas into the inner muffle preferably onto the surface of or into the molten metal of the tray 34.

The space 70 between the inner muffle and the walls of the outer muffle should be large in comparison to the volume of the inner seal space so that any air or furnace gas leaking inward through the outer seal is diluted by the gas in such space. This will reduce the number of molecules of contaminants impinging on the inner seal and tending to leak into the inner muffle.

A tray 98 for containing molten absorbing metal of the same types as used in the inner muffle may also be used anywhere within the space 70 to abstract contaminants from the gas in this space, particularly any which may have penetrated the outer seal, or any which have been expelled from the space 60 tending to leak back thereinto. This tray preferably extends about the perimeter of the inner wall 76.

To further prevent the intrusion of contaminants into the inner seal a sheet of metal 100, FIG. 4, can be laid on the top of the inner seal largely protecting it from the impingement of molecules of contaminants. Preferably this sheet is of iron containing a relatively large amount of aluminum which will capture oxygen.

It will now be clear that this invention provides a muffle means whose parts are readily separated or disengaged for the removal of the parts or assemblies which have been soldered within it, the entire muffle means being adapted for insertion and removal in the furnace as an assembled unit, as indicated in FIG. 3.

Furthermore it provides in the same means an atmosphere of high purity because contaminants are abstracted by the selected molten metal within the muffle, and because the seals preserve the purity when it is achieved.

Furthermore it is important that the molten absorbing metal be within the muffle so that it can absorb contaminants from the parts to be soldered. These may be present on the surface of the parts or contained or absorbed by the material of which they are made.

While I have illustrated a specific form in this invention it is to be understood that I do not intend to limit myself to this exact form but intend to claim my invention broadly as indicated by the appended claims.

What is claimed is:

1. Apparatus to be heated for use in soldering an assembly in an atmosphere of selected gas comprising an inner muffle of hollow parts positioned in spaced relation defining a hollow interior, said parts having spaced lapping walls defining a seal space therebetween for a granular seal, granular material in said seal space for sealing said inner muffle, said inner muffle serving to house said assembly therewithin, an outer muffle means of parts juxtaposed in spaced relation defining a hollow interior and housing said inner muffle therewithin, the last said parts having lapping walls spaced apart defining an outer seal space therebetween, granular material in said outer seal space for sealing said outer muffle means, walls forming a heating furnace enclosing said outer muffle means, magnesium in said inner muffle for absorbing oxygen and nitrogen during heating of said muffles to promote the soldering of said assembly when housed within said inner muffle, and a quantity of aluminum positioned in the space between said inner and outer muffles to absorb contaminants in said space.

2. Apparatus to be heated for use in soldering an assembly in an atmosphere of selected gas comprising an inner muffle of hollow parts positioned in spaced relation defining a hollow interior, said parts having lapping walls defining a seal space therebetween for a granular seal, granular material in said seal space for sealing said inner muffle, said inner muffle serving to house said assembly therewithin, an outer muffle having parts juxtaposed in spaced relation defining a hollow interior and housing said inner muffle therewithin, the last said parts having lapping walls spaced apart defining an outer seal space therebetween, granular material in said outer seal space for sealing said outer muffle, walls forming a heating furnace enclosing said outer muffle, absorbing material in said outer muffle for removing contaminants, and duct means in communication with the interior of said inner muffle to supply a selected non-oxydizing gas to the interior thereof for continuing flow outward through said inner seal into said interior of said outer muffle and flow outward therefrom through said outer seal.

3. Apparatus to be heated for use in soldering an assembly in an atmosphere of selected gas comprising an inner muffle of hollow parts positioned in spaced relation defining a hollow interior, said parts having lapping walls defining a seal space therebetween for a granular seal, granular material in said seal space for sealing said inner muffle, said inner muffle serving to house said assembly therewithin, an outer muffle having parts juxtaposed in spaced relation defining a hollow interior and housing said inner muffle therewithin, the last said parts having lapping walls spaced apart defining an outer seal space therebetween, granular material in said outer seal space for sealing said outer muffle, walls forming a heating furnace enclosing said outer muffle, a quantity of magnesium in said outer muffle for removing contaminants, and duct means in communication with the interior of said inner muffle to supply hydrogen gas to the interior thereof for continuing flow outward through said inner seal into said interior of said outer muffle and flow outward therefrom through said outer seal.

References Cited in the file of this patent

UNITED STATES PATENTS

| | | |
|---|---|---|
| 1,956,818 | Acre | May 1, 1934 |
| 2,162,143 | Vreeland | June 13, 1939 |
| 2,189,624 | Bramble | Feb. 6, 1940 |
| 2,204,889 | Freeland | June 18, 1940 |
| 2,297,798 | Peck | Oct. 6, 1942 |
| 2,315,294 | Stewart et al. | Mar. 30, 1943 |
| 2,539,246 | Hensel | Jan. 23, 1951 |
| 2,606,016 | Lindh et al. | Aug. 5, 1952 |
| 2,714,760 | Boam et al. | Aug. 9, 1955 |
| 2,747,066 | Brace | May 22, 1956 |
| 2,851,375 | Samuel | Sept. 9, 1958 |